(12) United States Patent
Kram et al.

(10) Patent No.: US 10,386,810 B2
(45) Date of Patent: Aug. 20, 2019

(54) METHOD FOR OPERATING A TECHNICAL SYSTEM, CONTROL APPARATUS, COMPUTER PROGRAM PRODUCT AND THE TECHNICAL SYSTEM

(71) Applicant: SIEMENS AKTIENGESELLSCHAFT, Munich (DE)

(72) Inventors: Raimund Kram, Erlangen (DE); Uwe Ladra, Erlangen (DE); Hartmut Linke, Erlangen (DE); Elmar Schaefers, Fuerth (DE); Peter Wagner, Hersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 414 days.

(21) Appl. No.: 14/975,126

(22) Filed: Dec. 18, 2015

(65) Prior Publication Data

US 2016/0179079 A1 Jun. 23, 2016

(30) Foreign Application Priority Data

Dec. 22, 2014 (EP) ..................................... 14199688

(51) Int. Cl.
*G06F 19/00* (2018.01)
*G05B 19/19* (2006.01)
(Continued)

(52) U.S. Cl.
CPC .......... *G05B 19/19* (2013.01); *G05B 19/416* (2013.01); *G06F 17/141* (2013.01); *G05B 2219/34015* (2013.01); *G05B 2219/35585* (2013.01)

(58) Field of Classification Search
CPC combination set(s) only.
See application file for complete search history.

(56) References Cited

U.S. PATENT DOCUMENTS 4,676,002 A * 6/1987 Slocum .................... B25J 9/046
33/1 MP
5,426,722 A * 6/1995 Batchelder ......... G05B 19/4103
700/245

(Continued)

FOREIGN PATENT DOCUMENTS

| DE | 100 65 422 A1 | 7/2002 |
| DE | 101 64 496 A1 | 7/2003 |
| DE | 10 2005 027437 A1 | 12/2006 |

*Primary Examiner* — Kidest Bahta
(74) *Attorney, Agent, or Firm* — Cozen O'Connor

(57) ABSTRACT

A method for operating a technical system, an apparatus and method for determining a movement profile, control apparatus and the actual technical system that includes at least one drive to move at least one axis, wherein at least one optimized movement profile of the axis is calculated with the aid of an optimization method that calculates an optimized movement profile with reference to preset points of a movement profile and/or preset regions of the movement profile, where for simplified and particularly understandable use, the optimization method includes physical boundary conditions from the start of the optimization method, where the use and initialization of the technical system by the user is made more understandable, for example, and where the optimized movement profile is used to control the at least one drive of the technical system.

19 Claims, 5 Drawing Sheets

(51) Int. Cl.
*G06F 17/14* (2006.01)
*G05B 19/416* (2006.01)

(56) References Cited

U.S. PATENT DOCUMENTS

| | | | |
|---|---|---|---|
| 8,843,237 B2 * | 9/2014 | Aurnhammer | G05B 19/416 |
| | | | 700/262 |
| 2003/0078692 A1 | 4/2003 | Heber et al. | |
| 2005/0131563 A1 | 6/2005 | Kram et al. | |
| 2008/0215164 A1 * | 9/2008 | Denk | B25J 9/163 |
| | | | 700/29 |
| 2009/0088891 A1 * | 4/2009 | Birzer | G05B 19/416 |
| | | | 700/186 |
| 2010/0007302 A1 * | 1/2010 | Ewert | H02P 5/46 |
| | | | 318/625 |
| 2013/0119916 A1 * | 5/2013 | Wang | B25J 9/1664 |
| | | | 318/600 |

* cited by examiner

METHOD FOR OPERATING A TECHNICAL SYSTEM, CONTROL APPARATUS, COMPUTER PROGRAM PRODUCT AND THE TECHNICAL SYSTEM

BACKGROUND OF THE INVENTION

1. Field of the Invention

The invention relates to a method for operating a technical system, a computer program product, a control apparatus and the technical system.

2. Description of the Related Art

With a technical system, such as a machine tool, a production machine or a robot, movement profiles of one machine element are dependent on a movement profile of a further machine element.

DE 10 2005 027 437 A1 relates to a method and a control apparatus for guiding the movement of a movable machine element of a machine, where a movement profile is determined with the aid of an optimization criterion.

DE 10 65 422 A1 describes a method and a controller for optimizing flexible, high-quality cam functions via a control program or application program, where the cam functions are described by sections and non-preset segments are interpolated.

The disadvantage of the above-described conventional methods and controllers is the abstract and laborious creation of a movement profile, particularly a cam function.

SUMMARY OF THE INVENTION

It is therefore an object of the present invention to operate a technical system as efficiently as possible, particularly via a simplified creation or optimization of a movement profile.

This and other objects and advantages are achieved in accordance with the invention by providing an apparatus for determining a movement profile, a control apparatus, a technical system, a computer program product, and a method for operating a technical system, where the technical system comprises at least one drive to move at least one axis, where at least one optimized movement profile of the axis is calculated with the aid of an optimization method, and where the optimization method calculates the optimized movement profile with reference to preset points of a movement profile and/or preset regions of the movement profile. In accordance with the invention, physical boundary conditions are included in the optimization method, and the optimized movement profile is used to control the at least one drive of the technical system.

The method for operating a technical system can comprise a method for the optimization, calculation and/or provision of movement profiles, particularly cam functions. A movement profile can in particular be a cam function.

A technical system can be a machine tool, a production machine, a production plant for the production of a basic material or a (complex) product, a robot, a parallel kinematics machine, a printing machine, a textile machine, a cutting machine or a crane.

An axis should be understood to be either a real axis as part of the technical system or a virtual axis. An axis or a group of axes can also be understood to be a master axis combined with a slave axis. A movement of an axis should be understood to be a rotational movement of an axis or a translational movement of an axis or an actuator.

A movement profile should be understood to be a specification of the velocity, rotational speed, and/or torque at which a drive, particularly in a technical system, moves or rotates at a specific time and/or at a specific position and/or alignment. A movement profile can be a velocity curve as a function of a position, a time and/or an alignment or an angle of rotation. The movement profile can, at least partially, be specified by a user. Movement profiles for different drives, particularly in a technical system, can be dependent on one other or several other movement profiles. A movement profile is frequently created with the aid of a computer program. At the same time, movement profiles can also be optimized with respect to the intended application.

A movement profile is optimized with the aid of the optimization method. The optimization method can be used to create and/or optimize a movement profile with reference to presets. An optimization method can transfer a movement profile into an optimized movement profile. Here, the movement profile is, for example, adapted to another (optimized) movement profile. A movement profile can also be supplemented with reference to presets with the aid of the optimization method. An optimization method should be understood to be a calculation specification that converts a function or a set of values into another function or another set of values. Following conversion, frequently a property of the function or the set of values is changed such that an assigned measure that can be assigned to the function is changed. As a rule, the assigned measure corresponds to the degree of the optimum adaptation of the movement profile to an optimum movement profile.

Physical boundary conditions should be understood to mean conditions that have to be satisfied by the optimized movement profile. For example, a boundary condition can be a restriction of at least one derivative of the movement profile in accordance with a time or a position. In particular, a physical boundary condition is a minimum/maximum velocity of a drive, a minimum/maximum torque, a maximum jerk (derivation of acceleration according to time or temporal change to a force/torque), a maximum force application of the drive on an element of the technical system, a maximum acceleration, a restricted running time of a drive in the technical system and/or a restricted development of heat by a drive in the technical system.

A drive should generally be understood to be an electric machine, an (electric) motor, a linear motor, a servomotor or a piezo element.

In one embodiment, it is possible to preset a (not fully defined) movement profile. The method for the operation of the technical system is used to determine an optimized movement profile. The optimized movement profile is created with the aid of the optimization method from the (preset, not completely defined) movement profile. During the optimization of the movement profile, direct consideration is paid to the physical boundary conditions. The calculation of a movement profile is generally performed with the aid of a computer program, in particular an engineering program. Advantageously, the movement profile can also be determined on the control apparatus of the technical system and/or with the aid of the optimization method.

Optimization of the movement profile can be performed in accordance with different target presets. A target preset can be preset by minimizing at least one derivation of the movement profile according to the position/time. Optimization can also be performed by minimizing/maximizing an integral of the movement profile and/or at least one of its derivations.

The optimization methods used are preferably conventional, known optimization methods.

The consideration of physical boundary conditions is performed during at least one step, preferably each step, of the optimization method. This means that downstream checking of an optimized movement profile, for example, by a CAM tool/CAM system, is dispensed with.

The embodiment in accordance with the invention can be performed much more simply, quickly and expediently than conventional solutions with which, particularly with the aid of a CAM tool, an optimized movement profile is transferred to a machine-readable language where it is checked with respect to the physical boundary conditions hence possibly necessitating a plurality of optimization passes between the optimization of the movement profile and the checking with reference to the physical boundary conditions for the creation of a suitable movement profile.

In an advantageous embodiment, the optimization method is configured to minimize energy consumption of the at least one electric drive, minimize the time for a pass of the movement profile and/or reduce vibrations in the technical system.

Particularly with knowledge of the technical data for the drive, a movement profile can be mapped to a value of the energy consumption, i.e., an energy consumption is assigned to the movement profile. Consideration/assignment of this mapping enables the minimization of the energy consumption of the drive and/or the technical system to be minimized. A movement profile can also be optimized such that the time required by the drive to implement the presets from the movement profile is minimized. A movement profile can also be optimized to minimize vibrations in the technical system. For the minimization, the Fourier transformation of the movement profile, particularly taking into account the physical properties of the technical system or the drives can be optimized such that the transformed movement profile is minimized in specific regions of the transformed movement profile. It is also possible to use another integral transformation instead of a Fourier transformation to transfer the movement profile into a "frequency domain".

For the optimization of the at least one movement profile, optimization methods weighted with respect to one another can also run simultaneously and/or in succession, where the physical boundary conditions are taken into account accordingly. Optimization with reference to special presets, such as reduction of the energy consumption, can in particular be performed when a plurality of movement profiles are matched to one another. This enables the method for operating the technical system to be operated for longer and in a more energy-efficient manner. It is particularly possible to use a weighted optimization function as a Lagrange function with parameterized boundary conditions for the optimization. In addition, the person skilled in the art is also familiar with further corresponding methods.

In a further embodiment, the technical system comprises at least one second drive to move a second movable axis. A technical system frequently comprises a plurality of drives, where the drives are used to move axes of the technical system. If a functional principle of the technical system matches and/or links different axes with respect to their effect on one another, this also affects the presets for the movement profiles for the individual drives. For example, the technical system can comprise a first axis, particularly a leading axis, and a further axis, wherein the movement of the at least one further axis is based on the movement of the first axis (leading axis). This means that the movement profile for the drive of the first axis presets the movement profile for the drive of the second axis.

It is also possible for a dependent optimization of the two interdependent movement profiles to be performed in accordance with the features presently described. A consideration of a plurality of axes in a technical system advantageously permits the operation of a plurality of drives such that the technical system can be operated in a particularly energy-efficient manner and/or for a particularly long time.

In a further advantageous embodiment, the second movable axis is moved in accordance with a second movement profile, where the first movement profile and the second movement profile are linked to one another. The linking of movement profiles for different drives is widely used. For example, the movement profile of a drive of one movement profile is dependent on another drive. An example of this is an electronic control system, where the rotational movement of one axis is aligned with a rotational movement of another axis. A dependence of this kind between two or more movement profiles is exemplified by a cam function. One possibility of creating a cam function of this kind is described, for example, in DE 100 654 22 A1.

The alignment of a movement profile by another movement profile can also be optimized jointly, where both movement profiles are optimized in dependence on one another.

The application of the method described for the optimization of movement profiles enables a technical plant to be operated in an energy-efficient manner in a simplified way.

In a further advantageous embodiment of the method, an optimized movement profile is calculated for both the first axis and the at least one further axis of the technical system. A calculation of a movement profile with reference to fixed presets is a particularly expedient possibility for the creation of a movement profile with which a drive of a technical system is to be controlled. In particular, cams are calculated in this way.

A preset movement profile to move a first axis via a first drive is used to define the second movement profile for the movement of second axis with the aid of the second drive. In other words, the movement of a second axis can be defined with reference to the movement of the first axis.

Following the optimization of the second movement profile, it is possible to use the features named here to change and/or optimize the first movement profile with reference to the first movement profile.

Subsequent optimization of different movement profiles, particularly with simultaneous consideration of physical boundary conditions, enables the movement profiles of the individual axes to be simply and quickly interwoven with each other and the energy efficiency of the technical system is advantageously increased.

In an advantageous embodiment, the optimization method is performed in a plurality of passes. At the same time, an optimized movement profile is calculated from a preset movement profile. Advantageously, the movement profile can be displayed after each pass of the optimization method by a visualization mechanism of the technical system. Optimization of a movement profile is frequently performed in a plurality of passes. The shape of the movement profiles originating from a pass of this kind approximates the optimized movement profile. As a rule, this can also be recognized in a depiction of a movement profile of this kind. With a depiction of a method for the optimization of a movement profile as described here, the person skilled in the art identifies from a comparison of the set of movement profiles the progress of the optimization and can optionally intervene manually in the course of the optimization if the optimization method so permits.

A visualization apparatus should be understood to mean a display, a printer, a monitor or a similar type of display suitable for visualizing movement profiles for a user. The depiction of the movement profiles on a visualization mechanism enables convergence problems to be detected during the optimization of the movement profile and optionally the optimization altered, such as by the user.

In a further advantageous embodiment, in order to calculate an optimized movement profile with reference to the minimization of the energy consumption, construction-related loss parameters of the drive are included as boundary conditions. Loss parameters should be understood to mean heat losses during the operation of the drive, particularly due to the heating of the laminated core and the winding, and losses from the converter used. If the specifications of the drive and/or the converter are known, the losses may be known for different operating states and/or operating times. The known or determined loss parameters can also be recorded via loss parameters determined via sensors, recorded and/or stored as a function of the time.

The determined and/or recorded loss parameters can be included as further information in the optimization method. The losses or loss parameters determined can also be displayed on a visualization unit.

Advantageously, the display of the loss parameters, particularly as a function of time, preferably periodically as a function of the inherent delay, can provide the user with information on the operating modes in which the drive and/or the technical system consume a large amount of energy. In particular, for depiction on the visualization mechanism, the time used can be the system time (i.e., the time used in the technical system, in particular the time that is periodically set to a fixed value and is then restarted), one or another, particularly absolute time can be used as a function argument for the display. The above-listed times can generally be used within the scope of the disclosed embodiments of the invention.

In addition to the aforementioned physical boundary conditions, derived from the structure of the technical system, particularly the drives of the technical system, for example, the loss of a drive due to magnetic losses in the laminated core or rheostatic losses from the windings can be determined or preset. In the case of conventional drive types, these values can be preset by data records, calculated by simulations and/or determined by sensors during operation. In addition, these determined loss parameters can be determined as a function of a time, particularly the inherent delay of the movement profile, and/or also optimized with the optimization method. The consideration of energy efficiency via loss parameters as a component to be minimized during the creation of the optimized movement profile advantageously contributes to a particularly energy-efficient and drive-protecting mode of operation of the technical system.

In a further advantageous embodiment of the method, the loss parameters are depicted on the visualization mechanism. The depiction of the loss parameters is performed either as a function of the system time or in dependence on the position or alignment of an axis. Advantageously, in the case of a periodic movement profile, it is possible for a plurality of loss parameters to be displayed as a function of a number of passes of the movement profiles. In particular, the loss parameter can be stored as a function of a time and in this way a so-called trace is generated. A trace is a list with time points and assigned loss parameters/values. It is also advantageously possible to display a trace of this kind on the visualization mechanism. The depiction of loss parameters enables the developer and/or user of the technical system to identify particularly energy-intensive processes and change them by changing the functional principle of the technical system and changing the mode of operation of the technical system to save energy.

In an advantageous embodiment, a Newton method, an SQP method, a Lagrange-Newton method, a Runge-Kutta method and/or a simplex method are used as the optimization method.

The problem of the optimization of the movement profile with reference to (physical) boundary conditions and/or further parameters, particularly loss parameters can often be converted to finding a zero point of a function. Here, this is achieved with the aid of a numerical method for determining a zero point.

Even if a conversion of this kind is unsuitable due to the nature of the problem, the aforementioned methods can be used for the minimization of a function.

Further possibilities for finding an optimized movement profile in accordance with the presets include a genetic algorithm or other generic methods.

Due to the familiarity of the optimization method, the use of the aforementioned optimization method is particularly advantageous for determining a zero point. This enables convergence problems with optimization of the movement profile to be effectively avoided.

It is also an object of the present invention to provide an apparatus for determining a movement profile or a plurality of movement profiles, which are in particular linked to one another, and advantageously comprises a computing unit, optionally a visualization mechanism, at least one interface for connection to a drive and/or a interface to connect the apparatus to a technical system, where the apparatus implements the method in accordance with the disclosed embodiments of the invention.

An apparatus of this kind can form part of the technical system. An apparatus of this kind can also be formed by a computing unit with an interface for connection to the technical system. Advantageously, a computer program is installed on the computing unit, which following transmission, is loaded into memory, particularly the working memory, of the computing unit and executed with the aid of a processor (CPU) of the computing unit.

For the determination of the one movement profile or the plurality of movement profiles, a method according to the invention is used to operate the technical system.

A computer program of this kind can also be an engineering program. An engineering program is advantageously used for presetting, calculation, processing, optimization and replaying at least one movement profile, particularly for movement profiles in a technical system, preferably also cam functions. A computer program of this kind can also be a program/computer program that can be executed on a stored program control (SPC) system.

The embodiment of the invention of the aforementioned object as a computer program enables a wide range of applications and flexible use for the operation of a technical system as described here.

It is also an object of the invention to provide a control apparatus for the technical system, where the control apparatus is provided to calculate an optimized movement profile for a movable axis or a plurality of optimized movement profiles, which are in particular linked to one another, for a plurality of movable axes, where at least one optimization method is provided to calculate the at least one optimized movement profile, and where the optimization method is provided to calculate the optimized movement profile with reference to preset points of a movement profile and/or preset regions of the movement profile. The control apparatus is configures such that physical boundary conditions are included in the optimization method and wherein the at least one optimized movement profile is provided to preset the movement of at least one drive in a technical system.

The control apparatus can, for example, be provided by an existing control apparatus, particularly an SPC, where the method in accordance with the disclosed embodiments of the invention is used to determine the at least one movement profile. The control apparatus can be used for both the provision or calculation of the movement profiles and the control of the technical system.

A control apparatus of this kind can for example be a SIMATIC or SIMOTION made by Siemens AG.

In an advantageous embodiment of the control apparatus, the optimization method for optimizing the movement profile is provided to minimize the energy consumption of at least one electric drive, minimize the time for a pass of the movement profile and/or to reduce vibrations in a technical system.

Optimization of the at least one movement profile is performed as explained above. In particular, the control apparatus is also suitable for implementing the method in accordance with the disclosed embodiments of the invention. The control apparatus can in particular be used for the calculation and/or optimization of cam functions.

To achieve the aforementioned objects, a computer program and/or a computer program product is advantageously used for installation on a computing unit, where the computer program product is provided to implement a method for operating the technical system in accordance with disclosed embodiments. The computer program is advantageously used to implement a method of this kind when executed on a computing unit. The movement profile or movement profiles created, calculated and/optimized by the execution of the computer program of the method for the operation of a technical system, particularly the at least one cam function generated in this way, is/are used to control the technical system. The technical system can also use the data via a technical data connection and the operation thereof.

A computing unit should be understood to mean a PC, a computer connected to the technical system via a local-area or non-local area network, an SPC, a notebook or a Macintosh computer.

For the optimization of the at least one movement profile, the movement profile can be embedded in a functional. The at least one equation of motion can be optimized with the aid of the method of the calculus of variations, in particular adapted to its boundary conditions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following describes and explains the invention with reference to figures. The features shown and described in the figures can be combined with one another or optionally left out without departing from the essence of the invention, in which.

DETAILED DESCRIPTION OF THE EXEMPLARY EMBODIMENTS

Figure 1:
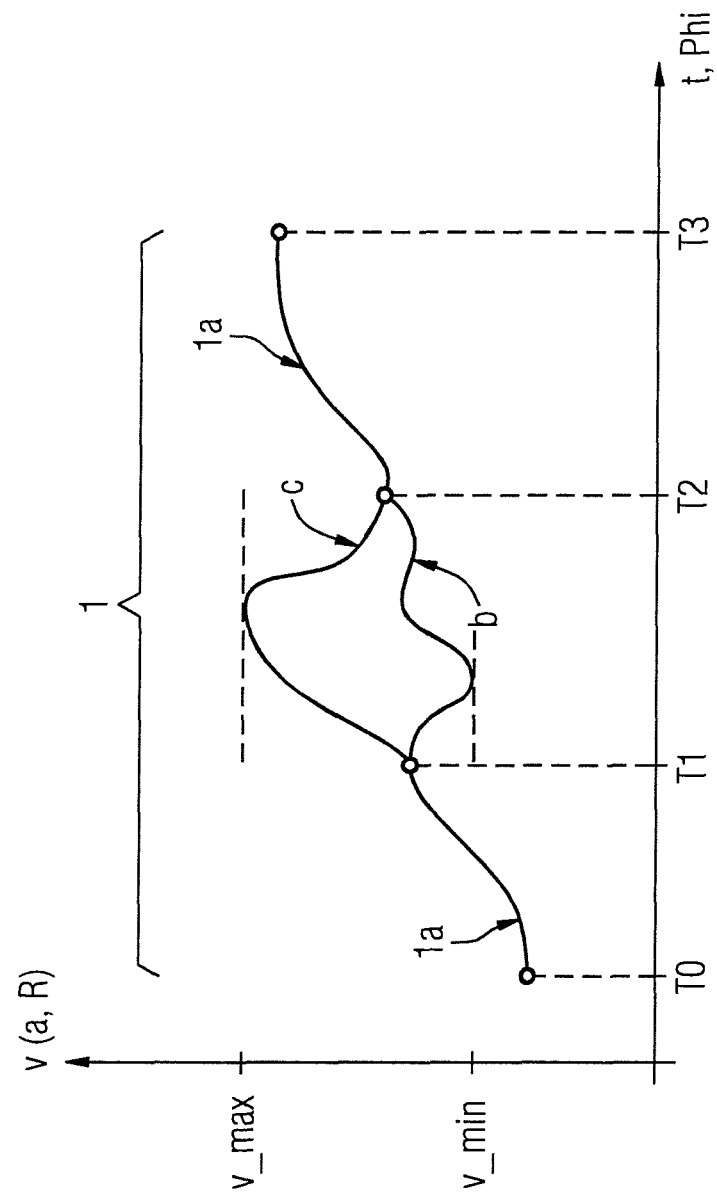
FIG. 1 is a graphical plot of a movement profile.

FIG. 1 shows a graphical plot of a movement profile 1. The movement profile is a velocity v (of either the acceleration a or the jerk R) as a function of the time t. The movement profile 1 is divided into three regions, where the two outer regions of the movement profile are preset regions of the movement profile 1a. The first region of the movement profile 1, 1a, starts at time point T0 and extends to time point T1. A second region of the movement profile 1 extends from time point T1 to time point T2. A third region of the movement profile 1, 1a extends from time point T2 to time point T3. The movement profile 1 between T1 and T2 is not preset by technical presets. The region of the movement profile 1 can extend along different possible courses. FIG. 1 shows two different possibilities for such a possible course a, b. In the exemplary graphical plot, the region of the movement profile 1 between time point T1 and the time point T2 can be determined by a method for operating a technical system TS. The entire movement profile 1 is made up of the three above-described regions (in the time range between T0 and T3).

The movement profile 1 can also be defined as a function of the alignment Phi instead of a function of the time. It is possible for a movement profile 1 and/or a region of a movement profile 1 to describe a periodic movement. The movement profile 1 describes, for example, the course of the rotational speed of a drive A of the technical system TS as a function of the time t or an alignment Phi, particularly an alignment Phi of a further drive A of the technical system TS.

The region of the movement profile between the two time points T2 and T3 is determined or calculated by the optimization method Opt. Possible suitable physical boundary conditions are a minimum velocity v_min and/or a maximum velocity v_max, a minimum and/or maximum acceleration, and/or a minimum/maximum jerk. Moreover, it is also possible for the optimization to be restricted by fixed presets in a region of the movement profile 1 that has not yet been preset.

The following designates generalized coordinates (jerk R, alignments Phi, distance, velocity v, acceleration, etc) with the reference q_i. The generalized variables can be dependent upon the time, an alignment or a further generalized variable. The term generalized variable is very familiar to the person skilled in the art from literature on classical mechanics. In addition, temporal derivations of the same should be considered to be generalized variables.

To calculate one or more movement profiles 1, 1a, it can be expedient to consider a plurality of generalized variables q_i in their coherence and/or in dependence on one another. To symbolize this, the generalized variables q_i are shown embedded in functions V(q_i), P(q_i), Q(q_i). The functions can also be functionals (functions of functions). The movement profile 1, 1a and/or the cam function 1, 1a can be understood as a function of at least one generalized variable $q\_i$, as a function of at least one further generalized variable $q\_i$ and/or as a function of the time $q\_i(t)$.

Figure 2:
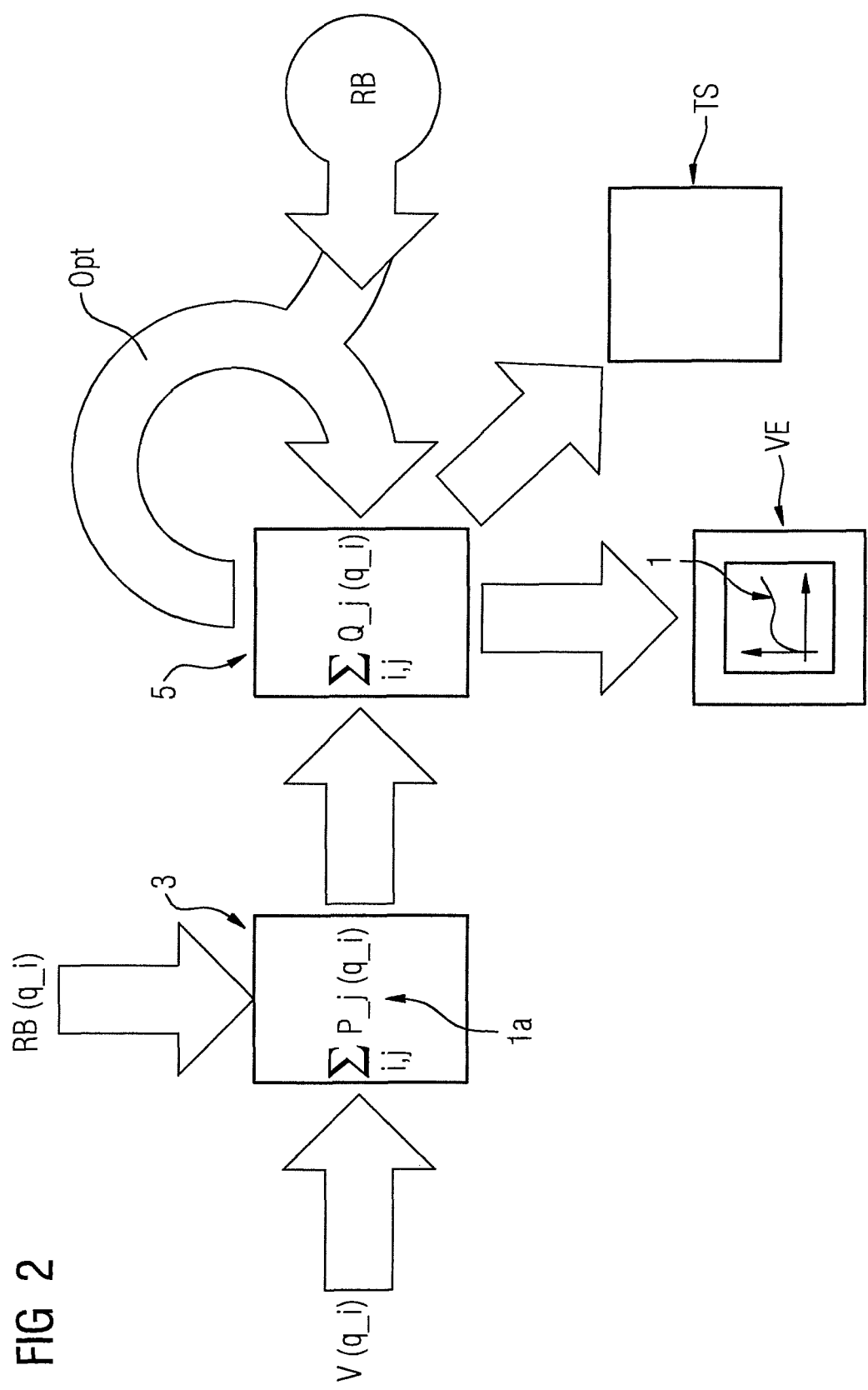
FIG. 2 is schematic block diagram of a method for the calculation of a movement profile in accordance with the invention.

FIG. 2 shows a method for the calculation of a movement profile 1. In a first step 3, the movement profile 1 is assembled with reference to preset points $V(q\_i)$ or preset regions $V(q\_i)$, and optionally with respect to physical boundary conditions RB, to form a provisional movement profile 1a. The entire provisional movement profile 1a can be depicted as a summation of functions $P\_j(q\_i)$. Suitable functions $P\_j$ are polynomials, optionally in combination with trigonometric functions $P\_j$=polynomial*sine/cos function. Particularly suitable as polynomials are orthogonal polynomials or spline functions.

In a further step 5, the optimized movement profile 1 is created from the provisional movement profile 1a with the aid of the optimization method Opt and taking into account the physical boundary conditions RB. Here, optionally the functions $Q\_j$ change, but optionally only in their parameterization.

The optimization method Opt can be passed through several times until the desired degree of optimization of the optimized movement profile 1 is achieved. Following each pass, the optimized movement profile 1 can be displayed on a visualization mechanism VE. This enables a user to appraise the progress of the optimization method and optionally intervene in the optimization method, such as in the case of convergence problems with the optimization.

The optimized movement profile 1 is used for the operation of the technical system TS. The method for the calculation of a movement profile 1 can be installed on or executed on a computing unit RE or a control apparatus of the actual technical system TS (for example, in a runtime mode of an SPC).

The movement profile is advantageously also calculated and/or displayed as a function of generalized coordinates $q\_i$. Generalized coordinates $q\_i$ are, for example, the location of an actuator, the alignment Phi of the actuator or a drive A, a velocity v, an acceleration a, a jerk or the time t.

The optimization method Opt can, for example, change the movement profile in a small region, where the physical boundary conditions RB are taken into account, and then calculate whether this change to the movement profile 1 is commensurate with at least one alignment of the optimization method Opt.

The method can also be used to calculate a plurality of movement profiles 1, particularly for a plurality of drives A of the technical system TS simultaneously or in succession. Similarly, technical presets of the technical system 1, such as a movement profile of a further drive of the technical system 1, can be included in the method.

Figure 3:
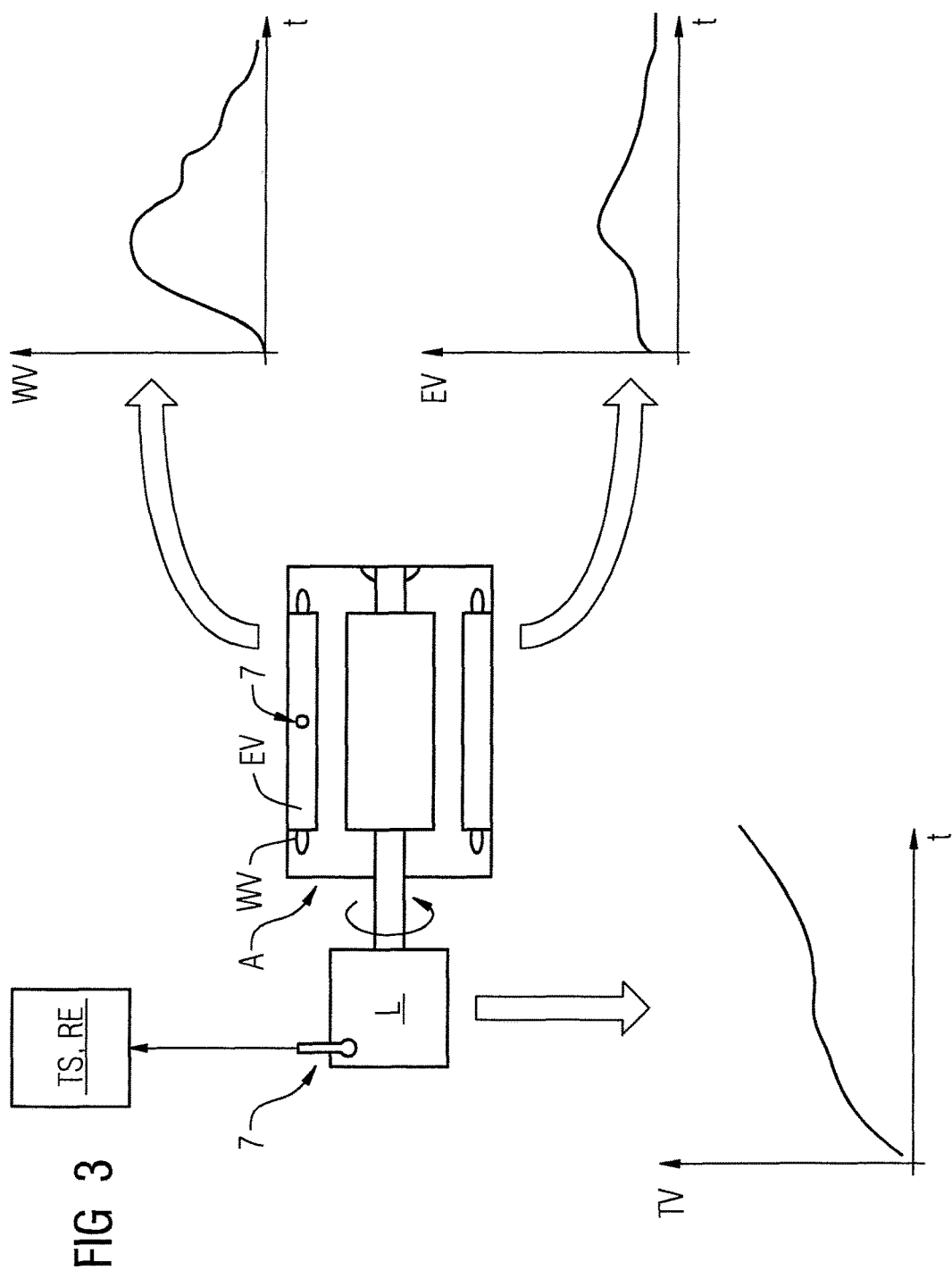
FIG. 3 is schematic block diagram of a drive and exemplary loss parameters.

FIG. 3 shows a drive and exemplary loss parameters WV, RV, WV, EV. The drive A comprises a plurality of regions where losses occur. On the one hand, the drive A shown comprises a laminated core, where the laminated core is heated by leakage fields during operation of the drive A. The losses that occur during the heating of the laminated core by leakage fields are designated core losses EV. The core losses are shown in a diagram as a function of time, particularly the operating time of the drive A.

In particular, winding losses WV due to the ohmic resistance of the winding of a drive A occur when current flows through the winding. The winding losses WV are also expressed as an increase in the temperature of the winding. The winding losses WV can also be displayed and/or displayed as a function of time t, particularly the operating time of the drive A or the technical system TS. The loss parameters can be determined via a sensor 7 or a plurality of sensors assigned to the drive and/or the technical system TS.

This type of display or storage of a variable as a function of time is also known as tracing (i.e., the creation of a trace). The stored loss parameters WV, EV, RV, particularly the winding losses WV, core losses EV, friction losses RV or any other loss parameter can also be pre-stored. Particularly advantageously, the loss parameters were determined by the manufacturer of the drive A or of the technical system TS, preferably as traces. Here, the drive A is used to drive a load L. The load L, particularly as a part of the technical system TS, advantageously comprises a sensor 7. The sensor used can be a thermoelement, a magnetic field sensor, a friction sensor, an acceleration sensor, a motion sensor, a jerk sensor or a sensor for determining alignment 7.

The loss parameters WV, ER, RV can be included in the optimization method. The loss parameters WV, EV, TV can mean scalar variables or stored traces of the loss parameters WV, EV, TV. Particularly in the case of minimizing the energy consumption, it is advisable for the optimization method to take account of the loss parameters, optionally as a trace.

Figure 4:
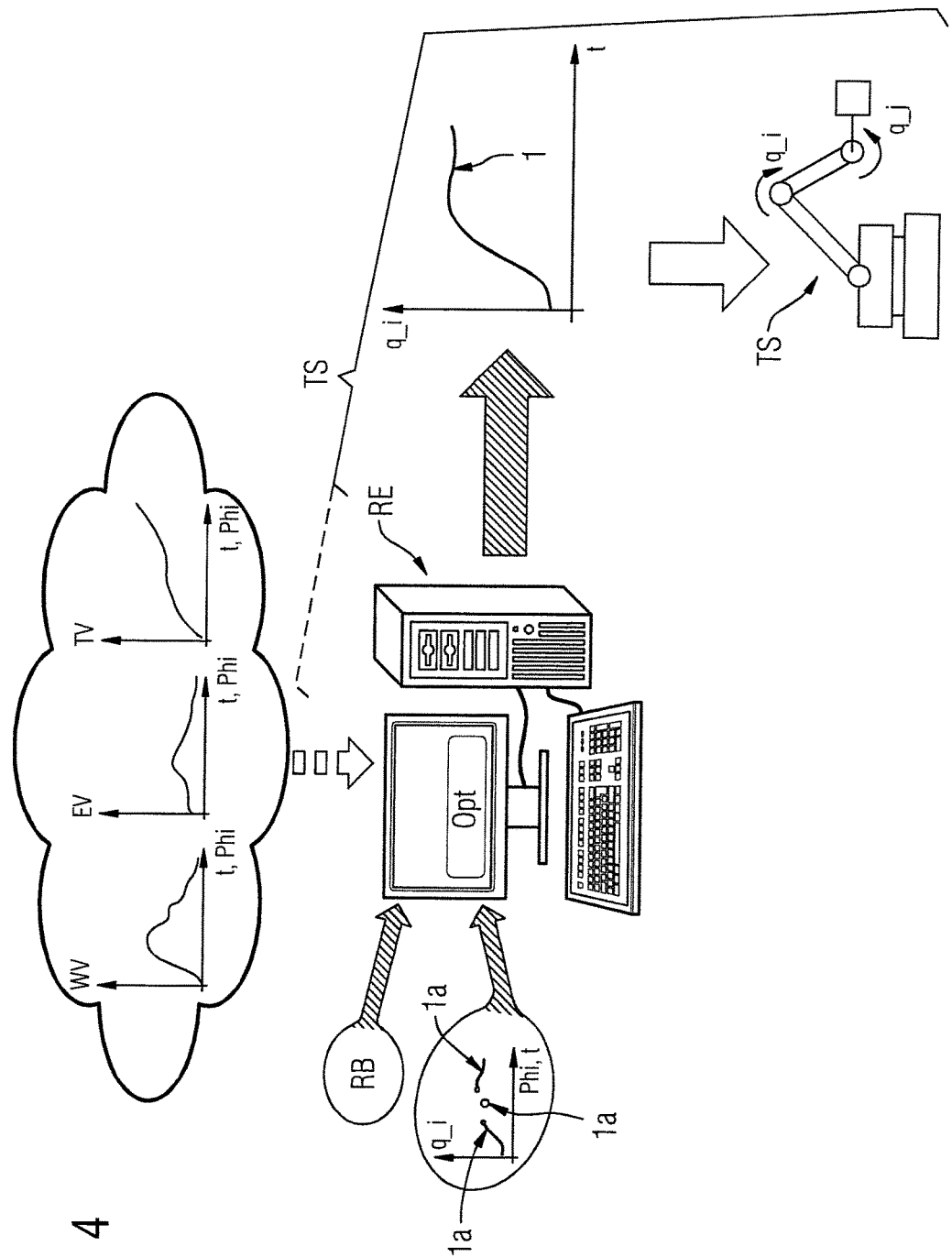
FIG. 4 is a schematic block diagram of an exemplary method for operating a technical system.
Figure 5:
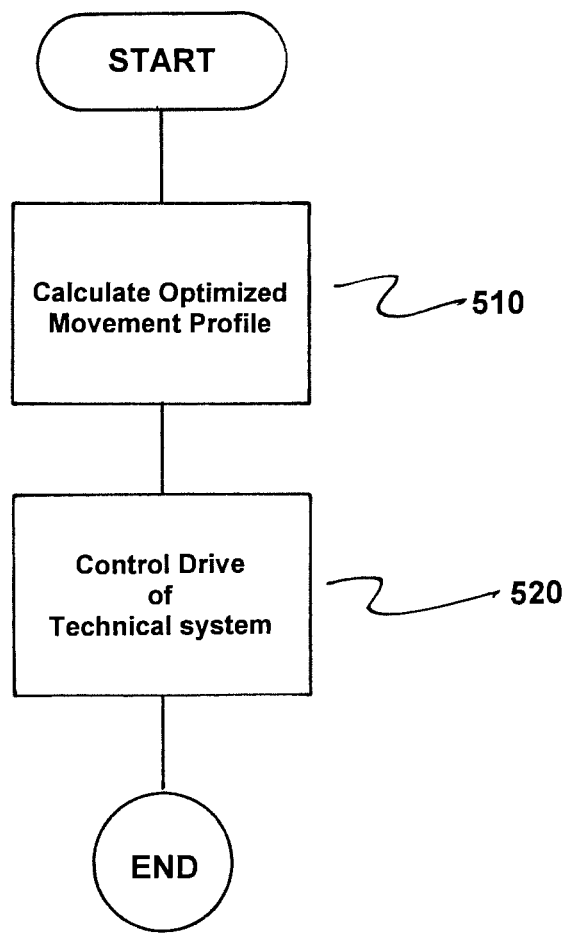
FIG. 5 is a flowchart of the method in accordance with the invention.

FIG. 4 shows an exemplary method for operating a technical system TS. The technical system TS comprises a computing unit RE, where the computing unit RE is provided to calculate the optimized movement profile 1. A provisional movement profile 1 is provided for the calculation of the optimized movement profile 1. Physical boundary conditions RB are also preset. Optionally, loss parameters WV, EV, TV as a function of time t, an alignment Phi or a position can be included in the calculation of the optimized movement profile 1.

From the above, the computing unit RE uses the optimization method Opt to calculate an optimized movement profile 1. The optimized movement profile 1 is displayed as a function of at least one generalized variable $q\_i$ ($i=1, \ldots$ N).

The optimized movement profile 1 is used to determine the alignment, the rotational speed and/or of the torque of at least one drive A of the technical system. This is elucidated in the depiction of the part of the technical system TS on the bottom right. Here, the generalized variables $q\_i$, $q\_j$ designate alignments Phi of the arms or actuators of a robot, where the robot represents at least a part of the technical system TS.

Particularly and advantageously, the generalized variables are based on variables, distances and alignments Phi with reference to at least one actuator, reference point or load L of the technical system TS. This can achieve a particularly simple and graphical presetting and analysis of the movement profile 1, 1a by the user.

In sum, the invention relates a method for operating a technical system TS, an apparatus and method for determining a movement profile 1, a control apparatus and an actual technical system TS. At the same time, the technical system TS comprises at least one drive A to move at least one axis, where at least one optimized movement profile 1 of the axis is calculated with the aid of an optimization method Opt, where the optimization method Opt calculates the optimized movement profile 1 with reference to preset points of a movement profile 1a and/or preset regions of the movement profile 1a. For simplified and particularly graphic use, physical boundary conditions RB are included in the optimization method Opt from the start of the optimization method Opt. Thus, the use and initialization of the technical system TS is made more graphical by the user. The optimized movement profile 1 is used to control the at least one drive A of the technical system TS.

In accordance with an embodiment, the problem that the productivity of a technical system TS, particularly a machine, can be restricted by the fact that individual drives A are sufficient for their maximum thermal load is solved. The cause of this can be that a connection of a movement profile 1, 1a, particularly the cam function 1, 1a (often called cam 1, 1a for short), which defines the movement of the at least one axis/of a drive A in dependence on a further axis/of a drive A, particularly a leading axis.

In the case of complex technical systems TS, particularly a machine or a production machine, it is not currently possible to identify the critical regions of the movement profile 1, 1a or the cam 1, 1a resulting in this maximum, in particular thermal, load. The maximum thermal can also be a physical boundary condition RB, particularly a physical boundary condition RB dependent on the time t and/or the alignment Phi.

At present, an improvement to above-mentioned problem is only possible by trial and error.

Therefore, it is a central concept of invention to use the creation of a trace (or trace function) to display, record or store the recording of the variables known to the control system, particularly measured variables, and their mathematical links. Modern control apparatuses, such as a SIMOTION or SIMATIC control apparatus made by the company Siemens AG, generally have functions of this kind for recording, processing and storage.

In the case of a technical system TS, particularly in the case of a real machine TS (compared to a machine that can only be simulated within the context of engineering programs), this enables the movements initiated by the drives A to be depicted and optionally processed, particularly visualized, by a trace.

In particular, with respect to the heating of the at least one drive A, this enables a thermal load on the drive A to be recorded, determined or evaluated as a function of time.

In an embodiment of the present invention, determined or presettable variables, particularly the at least one trace, and/or the known variables of individual components of the technical system TS (converter, drive A, mechanical elements) can be used to determine loss values via a computer and/or determined or recorded with the aid of an (internal) loss model.

The losses can, for example, be determined for the following categories:

Drive losses, such as losses due to the ohmic resistance of the windings of the at least one drive A (Joule heat) and "core losses" EV. A core loss should be understood to mean heating of the laminated core of the at least one drive A that occurs due to magnetic leakage fields.

In addition, the losses of the converter or further technical or electronic components, particularly the technical system TS, can also be included in the calculation of the losses. For example, the loss of the converter is the power loss of the converter, calculated as the power output of the converter (for the drive A) multiplied by a characteristic value for the loss of the converter.

An advantageous application of the invention is in particular suitable for customized loss models for example of an existing machine or a planned/real technical system TS.

The user of a technical system TS can use the above-described embodiments of the invention to identify critical regions with respect to energy consumption and/or heat dissipation from the technical system TS or the individual drives A and, with reference to the information, to optimize the at least one movement profile 1, 1a or the at least one cam function 1, 1a according to the requirements (such as minimum loss, minimum time, minimum vibration, minimum friction).

Advantageously, the losses can be determined or recorded by computer or by the loss model, particularly in a trace, from the above known variables (properties of the drive A and the converter).

The loss model can include a computed weighting of the thermal losses of the drive during operation, particularly as a function of the time, the thermal losses of the converter (and/or further electronic components) and processor-specific or technical system-specific loss models (e.g., relating to friction).

Advantageously, the above-described embodiment of the invention permits: (i) transparency of the energy consumption, particularly in the case of complex technical systems TS and plants, (ii) identification of critical regions, particularly with respect to energy consumption and heating of components, (iii) the resultant possibility for the optimization of the movement profiles, particularly of cam functions 1, 1a, and (iv) use of movement profiles 1, 1a, or of cam functions permitting particularly energy-saving operation of the at least one drive or the technical system.

In accordance with a further embodiment of the invention, movement profiles 1, 1a, in particular cam functions 1, 1a, are defined by standardized functions $P\_i$, $Q\_i$, $q\_i$ (as a rule polynomials). Hence, to date, movement profiles 1, 1a or cam functions 1, 1a are created by assembly from standardized functions $P\_i$, $Q\_i$ (or $q\_i(t)$) of this kind.

To date, the compatibility of the movement profiles 1, 1a or cam functions 1, 1a created in this way are generated in an "geometric space". To date, the compatibility of the movement profiles with physical boundary conditions RB (e.g., maximum acceleration, maximum velocity, or maximum jerk) is only established following the creation of a movement profile 1, 1a or the cam function 1, 1a with the aid of the CAM tool. If the physical boundary conditions RB for a envisaged velocity of an axis moved by a drive A are infringed, the velocity is to be reduced according to the physical boundary conditions RB. To date, often with reference to previously defined regions (standardized regions), the movement profiles 1, 1a or the cam function 1, 1a are varied until the physical boundary conditions RB are observed. Here, taking into consideration individual preset points (which, for example, between defined regions of a (non-optimized)) cam function 1a or a (non-optimized) movement profile 1a can be defined. In addition, from these movement profiles 1, 1a or cam functions 1, 1a, it is possible for points or regions to be defined or inserted such that they observe the physical boundary conditions RB particularly after the at least one pass of the optimization method Opt. In other words, the intermediate points influence the optimization of the cam function 1, 1a or the movement profile 1, 1a following the optimization (particularly the pass of the optimization method Opt).

Conventional systems and methods specify that the generation/calculation of a movement profile 1, 1a or a cam function 1, 1a is disadvantageously performed with the aid of a laborious interactive process that does not always produce an optimum result. In addition, it is not possible to take account of a loss model when planning movement profiles 1, 1a or a cam function 1, 1a.

In accordance with a further embodiment of the invention, an engineering program (or engineering tool) is used to facilitate and elucidate the definition of the cams 1, 1a or the movement profile 1, 1a. To this end, the definition and optimization of the movement profile 1, 1a or the cam function 1, 1a are performed in a "physical space", i.e., the physical boundary conditions RB are introduced directly into both the creation and the optimization method Opt of the movement profile 1, 1a or the cam function 1, 1a. Hence, direct account is taken of the physical boundary conditions RB (maximum velocity, maximum acceleration, or maximum jerk). The cam function 1, 1a or the movement profile 1, 1a is automatically generated with the aid of the method described here, particularly with the aid of the optimization method Op without requiring the use of a CAM tool. In this case, it is advantageous to use optimization methods Opt that align the cam function 1, 1a or the movement profile 1, 1a in accordance with optimization criteria. Optimization criteria can be:

1. time-optimized optimization,
2. loss-optimized optimization, or
3. avoidance of a vibration frequency at specific velocities or acceleration courses of the leading axis.

Optimization of the movement profile 1, 1a or the cam function 1, 1a is, for example, performed taking into account movement profiles and/or on axis configurations or drive configurations.

The invention can, for example, comprise an engineering tool for optimization of movement profiles 1, 1a and/or cam functions 1, 1a.

To take into account different optimization criteria (time-minimized pass, loss-minimized pass, pass with lowest possible thermal losses), in each case one or more optimization methods Opt as part of the engineering program can be used to create and/or optimize the at least one cam function 1, 1a or the at least one movement profile 1, 1a.

The creation and/or optimization of the cam function can also occur directly in the runtime system of the control apparatus or in the runtime system of a sequential quadratic programming (SPC) method.

Advantageously, the user receives a simplified and clearer possibility for creating movement profiles or cams. For the purposes of the disclosed embodiments of the invention, the calculation, creation and/or optimization of the cam function 1, 1a or of the movement profile 1, 1a and the plausibility check with reference to the physical boundary conditions is performed in an engineering system or in a control apparatus/SPC.

FIG. 3 is a flowchart of a method for operating a technical system (TS) comprising at least one drive to move at least one movable axis. The method comprises calculating at least one optimized movement profile (1) of the at least one movable axis via the optimization method (Opt), as indicated in step 510. In accordance with the invention, the optimization method (Opt) includes physical boundary conditions (RB) and calculates the optimized movement profile (1) with reference to at least one of preset points of a movement profile (1a) and preset regions of the movement profile (1a).

The at least one drive (A) of the technical system (TS) is now controlled via the optimized movement profile (1), as indicated in step 520.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for increasing operational efficiency of a technical system comprising at least one drive which moves at least one movable axis, the method comprising:
calculating, by a computer including a processor, at least one optimized movement profile of the at least one movable axis via the optimization method, the optimization method including physical boundary conditions and calculating the optimized movement profile with reference to at least one of preset points of a movement profile and preset regions of the movement profile, the movement profile comprising a plurality of outer preset regions and an inner region determinable via a method for operating a technical system; and
controlling, by the computer including the processor, the at least one drive of the technical system based on the optimized movement profile such that operational efficiency of the at least one drive of the technical system is increased.

2. The method as claimed in claim 1, wherein the optimization method is configured to at least one of (i) minimize energy consumption of the at least one electric drive, (ii) minimize a time for one pass of the movement profile, and (iii) reduce vibrations in the technical system.

3. The method as claimed in claim 1, wherein the technical system comprises at least one second drive to move at least one second movable axis.

4. The method as claimed in claim 2, wherein the technical system comprises at least one second drive to move at least one second movable axis.

5. The method as claimed in claim 3, wherein the second movable axis is moved in accordance with a second movement profile; and wherein the first movement profile and the second movement profile are interlinked.

6. The method as claimed in claim 1, wherein at least one of (i) the movement profile and (ii) the optimized movement profile comprises a cam function.

7. The method as claimed in claim 3, wherein an optimized movement profile is calculated for both the movable axis and the at least one second movable axis of the technical system.

8. The method as claimed in claim 1, wherein the optimization method calculates an optimized movement profile in a plurality of passes from at least one of (i) preset points and (ii) preset regions of a movement profile; and
wherein, after each pass of the optimization method, the movement profile is displayed by a visualization mechanism of the technical system.

9. The method as claimed in claim 2, wherein construction-related loss parameters of the drive are included as boundary conditions to calculate an optimized movement profile with reference to the minimization of the energy consumption.

10. The method as claimed in claim 8, wherein the loss parameters are depicted on the visualization mechanism.

11. The method as claimed in claim 1, wherein the optimization method comprises at least one of a Newton method, an Sequential quadratic programming method, a Lagrange-Newton method, a Runge-Kutta method and a simplex method.

12. An apparatus for determining a movement profile or a plurality of interlinked movement profiles for increasing operational efficiency of a technical system, the apparatus comprising:
   a computing unit including a processor;
   a visualization mechanism; and
   at least one of (i) at least one interface for connection to at least one drive and (ii) an interface to connect the apparatus to the technical system;
   wherein the apparatus is configured to:
      calculate at least one optimized movement profile of at least one movable axis via an optimization method, the optimization method including physical boundary conditions and calculating the optimized movement profile with reference to at least one of preset points of a movement profile and preset regions of the movement profile; and
      control the at least one drive of the technical system based on the optimized movement profile such that operational efficiency of the at least one drive of the technical system is increased; and
   wherein the movement profile comprising a plurality of outer preset regions and an inner region determinable via a method for operating a technical system.

13. A control apparatus for a technical system, said control apparatus calculating at least one optimized movement profile for one of (i) a movable axis and (ii) a plurality of interlinked optimized movement profiles comprising a plurality of outer preset regions and an inner region determinable via a method for operating the technical system to increase operational efficiency of the at least one drive of the technical system, and a plurality of movable axes, the control apparatus comprising:
   at least one optimization method which calculates the at least one optimized movement profile with reference to at least one of (i) preset points of a movement profile and (ii) preset regions of the movement profile;
   wherein physical boundary conditions are included in the optimization method; and
   wherein the at least one optimized movement profile sets movement of at least one drive in the technical system.

14. The control apparatus as claimed in claim 12, wherein the optimization method for optimizing the movement profile at least one of (i) minimizes energy consumption of at least one electric drive of the technical system, (ii) minimizes a time for a pass of the movement profile and (iii) reduces vibrations in the technical system.

15. A technical system comprising:
   at least one of:
      (i) an apparatus for determining a movement profile or a plurality of interlinked movement profiles, the movement profile comprising a plurality of outer preset regions and an inner region determinable via a method for operating a technical system, comprising:
         a computing unit including a processor;
         a visualization mechanism; and
         at least one of (i) at least one interface for connection to a at least one drive and (ii) an interface;
      wherein the apparatus is configured to:
         calculate at least one optimized movement profile of at least one movable axis via an optimization method, the optimization method including physical boundary conditions and calculating an optimized movement profile with reference to at least one of preset points of a movement profile and preset regions of the movement profile; and
         control the at least one drive based on the optimized movement profile such that operational efficiency of the at least one drive of the technical system is increased; and
      (ii) a control apparatus which calculates the at least one optimized movement profile for one of (i) the movable axis and (ii) the plurality of interlinked optimized movement profiles, and a plurality of movable axes, the movement profile comprising the plurality of outer preset regions and the inner region determinable via the method for operating the technical system to increase the operational efficiency of the at least one drive of the technical system, the control apparatus comprising:
         at least one optimization method which calculates the at least one optimized movement profile with reference to at least one of (i) the preset points of the movement profile and (ii) the preset regions of the movement profile;
      wherein physical boundary conditions are included in the optimization method of the control apparatus; and
      wherein the at least one optimized movement profile sets movement of at least one drive.

16. A non-transitory computer program product encoded with a computer program executed by a computing unit including a processor which operates a technical system comprising at least one drive to move at least one axis, the computer program comprising:
   program code for calculating, by the computer unit including the processor, at least one optimized movement profile of the at least one axis via the optimization method, the optimization method including physical boundary conditions and calculating the optimized movement profile with reference to at least one of preset points of a movement profile and preset regions of the movement profile, and the movement profile comprising a plurality of outer preset regions and an inner region determinable via a method for operating a technical system; and
   program code for controlling, by the computer unit including the processor, the at least one drive of the technical system based on the optimized movement profile such that operational efficiency of the at least one drive of the technical system is increased.

17. The control apparatus of claim 12, wherein the movement profile comprises a cam function.

18. The method as claimed in claim 11, wherein the movement profile comprises a cam function.

19. The technical system of claim 15, wherein the movement profile comprises a cam function.

* * * * *